(12) United States Patent
Wantland et al.

(10) Patent No.: US 10,877,643 B2
(45) Date of Patent: Dec. 29, 2020

(54) SYSTEMS AND METHODS TO INCREASE DISCOVERABILITY IN USER INTERFACES

(71) Applicant: Google LLC, Mountain View, CA (US)

(72) Inventors: Tim Wantland, Bellevue, WA (US); Kyle Pedersen, Seattle, WA (US)

(73) Assignee: Google LLC, Mountain View, CA (US)

( * ) Notice: Subject to any disclaimer, the term of this patent is extended or adjusted under 35 U.S.C. 154(b) by 236 days.

(21) Appl. No.: 15/921,724

(22) Filed: Mar. 15, 2018

(65) Prior Publication Data
US 2019/0286298 A1    Sep. 19, 2019

(51) Int. Cl.
| | |
|---|---|
| *G06F 3/0484* | (2013.01) |
| *G06F 3/0346* | (2013.01) |
| *G06F 3/0488* | (2013.01) |
| *G06F 3/0481* | (2013.01) |
| *G06F 3/01* | (2006.01) |
| *G06F 3/0482* | (2013.01) |
| *G06N 20/00* | (2019.01) |
| *G06K 9/32* | (2006.01) |

(52) U.S. Cl.
CPC .......... *G06F 3/04842* (2013.01); *G06F 3/012* (2013.01); *G06F 3/0346* (2013.01); *G06F 3/0481* (2013.01); *G06F 3/0482* (2013.01); *G06F 3/0488* (2013.01); *G06K 9/3233* (2013.01); *G06N 20/00* (2019.01)

(58) Field of Classification Search
CPC ...... G06F 3/013; G06F 3/04815; G06F 3/012; G06F 3/04842; G06F 3/0346; G06F 3/0481; G06F 3/0482; G06F 3/0488; G06N 20/00; G06K 9/32
See application file for complete search history.

(56) References Cited

U.S. PATENT DOCUMENTS

| | | | | |
|---|---|---|---|---|
| 9,524,036 | B1 * | 12/2016 | Cassidy | G06F 3/0346 |
| 2006/0246955 | A1 * | 11/2006 | Nirhamo | G06F 3/0482 455/566 |
| 2007/0061744 | A1 * | 3/2007 | Smith | G06F 9/451 715/763 |
| 2009/0170532 | A1 * | 7/2009 | Lee | H04M 1/72566 455/456.3 |
| 2009/0309849 | A1 | 12/2009 | Iwema et al. | |
| 2010/0057675 | A1 | 3/2010 | White et al. | |

(Continued)

FOREIGN PATENT DOCUMENTS

WO    WO2014/100953    7/2014

OTHER PUBLICATIONS

International Search Report and Written Opinion for Application No. PCT/US2018/047214, dated Nov. 9, 2018, 15 pages.

*Primary Examiner* — James T Tsai
(74) *Attorney, Agent, or Firm* — Dority & Manning, PA

(57) ABSTRACT

The present disclosure provides systems and methods to improve discoverability of selectable user interface elements. In particular, the present disclosure provides computing devices that, in some implementations, intelligently identify user interface elements that are selectable (e.g., based on intelligent understanding of the user interface content) and visually modify one or more of such selectable user interface elements to indicate to the user that they are selectable. The visual modification can highlight or otherwise draw attention to the user interface element(s), thereby improving their discoverability.

18 Claims, 7 Drawing Sheets

(56) References Cited

U.S. PATENT DOCUMENTS

| | | | |
|---|---|---|---|
| 2011/0291985 A1* | 12/2011 | Wakako | G06F 3/04817 345/174 |
| 2012/0260217 A1* | 10/2012 | Celebisoy | G06F 3/04815 715/836 |
| 2012/0309524 A1* | 12/2012 | Rajaraman | G07F 17/3227 463/31 |
| 2014/0019908 A1* | 1/2014 | Zhang | G06F 3/0488 715/802 |
| 2014/0372944 A1 | 12/2014 | Mulcahy et al. | |
| 2015/0009130 A1* | 1/2015 | Motta | G06F 3/012 345/156 |
| 2015/0009187 A1* | 1/2015 | Mercea | G06F 3/03545 345/179 |
| 2015/0082180 A1 | 3/2015 | Ames et al. | |
| 2015/0294220 A1* | 10/2015 | Oreif | G06F 16/338 706/12 |
| 2016/0048298 A1* | 2/2016 | Choi | G06Q 30/0267 715/846 |
| 2017/0078654 A1 | 3/2017 | Facin et al. | |
| 2017/0356812 A1* | 12/2017 | Madden | H03K 17/975 |

\* cited by examiner

SYSTEMS AND METHODS TO INCREASE DISCOVERABILITY IN USER INTERFACES

FIELD

The present disclosure relates generally to user interfaces. More particularly, the present disclosure relates to intelligent identification and highlighting of user-selectable user interface elements based on, for example, location of a user object relative to a display.

BACKGROUND

Computing devices (e.g., smartphones) can provide (e.g., display on a display screen) a user interface that enables the computing device to interact with a user, including, for example, receipt of commands from the user, providing (e.g., displaying) information to the user, and/or other functions.

At any given point in time, a user interface can include a number of different user interface elements. As examples, user interface elements can include icons, buttons, textual elements, items of content, pictures (e.g., pictures being captured in real-time via a camera and/or previously captured pictures), banners, titles, headers, entry fields, windows, menus, controls, graphics, and/or the like.

In some instances, some or all of the user interface elements in a user interface can be selectable by the user. As one example, a particular user interface element can correspond to an entity (e.g., location, point of interest, person, object, etc.) and the user can select the particular user interface element to receive additional information about the entity. In other examples, various other actions can be triggered by or result from selection of a user interface element by the user. As a further example, in some instances, a user can select a user interface element that is displayed on a touch-sensitive display screen by touching or tapping the display screen at the location at which the user interface element is displayed.

However, in some instances, it may not be readily apparent to the user which of the user interface elements are selectable. As one example, user interface elements may be presented uniformly regardless of whether or not they are selectable. As another example, a certain type of user interface element may traditionally not be selectable and, absent some indication to the user to the user that a particular element of that type is selectable, the user will assume that such particular element is not selectable. Thus, a user may, in fact, desire to trigger a particular action that would result from selection of a user interface element but not realize that the user interface element is selectable.

In one particular example, a user interface provided by a computing device can include a picture of a food dish and selection of the picture by the user (e.g., via touch input) would cause further actions to be performed by the computing device (e.g., retrieval and storage of a recipe for cooking the food dish so that the user can later view the recipe). The user may, in fact, be interested in cooking the dish at a later time and would therefore appreciate the opportunity to have the recipe received and stored. However, if the user does not realize that such action is available via selection of the user interface element, then the opportunity to satisfy the user's desire will go unrealized.

SUMMARY

Aspects and advantages of embodiments of the present disclosure will be set forth in part in the following description, or can be learned from the description, or can be learned through practice of the embodiments.

One example aspect of the present disclosure is directed to a computing device. The computing device includes one or more processors, a display, and one or more non-transitory computer-readable media that collectively store instructions that, when executed by the one or more processors, cause the computing device to perform operations. The operations include providing a user interface that comprises a plurality of user interface elements for presentation on the display. The operations include identifying one or more of the user interface elements that are selectable by a user of the computing device. The operations include visually modifying at least a first user interface element of the one or more selectable user interface elements to have a gleam appearance in which the first user interface element appears to reflect light.

Another example aspect of the present disclosure is directed to a computer-implemented method. The method includes providing, by one or more computing devices, a user interface that comprises a plurality of user interface elements for presentation on a display. The method includes identifying, by the one or more computing devices, one or more of the user interface elements that are selectable by a user. The method includes determining, by the one or more computing devices, an object location of a user object relative to the display. The user object is a finger or a stylus located adjacent to the display but not physically touching the display. The method includes determining, by the one or more computing devices, whether the object location of the user object corresponds to one of the one or more user interface elements that are selectable by the user. The method includes, when the object location corresponds to a first user interface element of the one or more selectable user interface elements, visually modifying, by the one or more computing devices, the first user interface element to visually highlight the first user interface element.

Another example aspect of the present disclosure is directed to an apparatus. The apparatus is configured to provide a user interface that comprises a plurality of user interface elements for presentation on a display. The apparatus is configured to identify one or more of the user interface elements that are selectable by a user. The apparatus is configured to modify display of selectable user interface elements as a function of a location of a finger or stylus located adjacent to the display but not physically touching the display.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
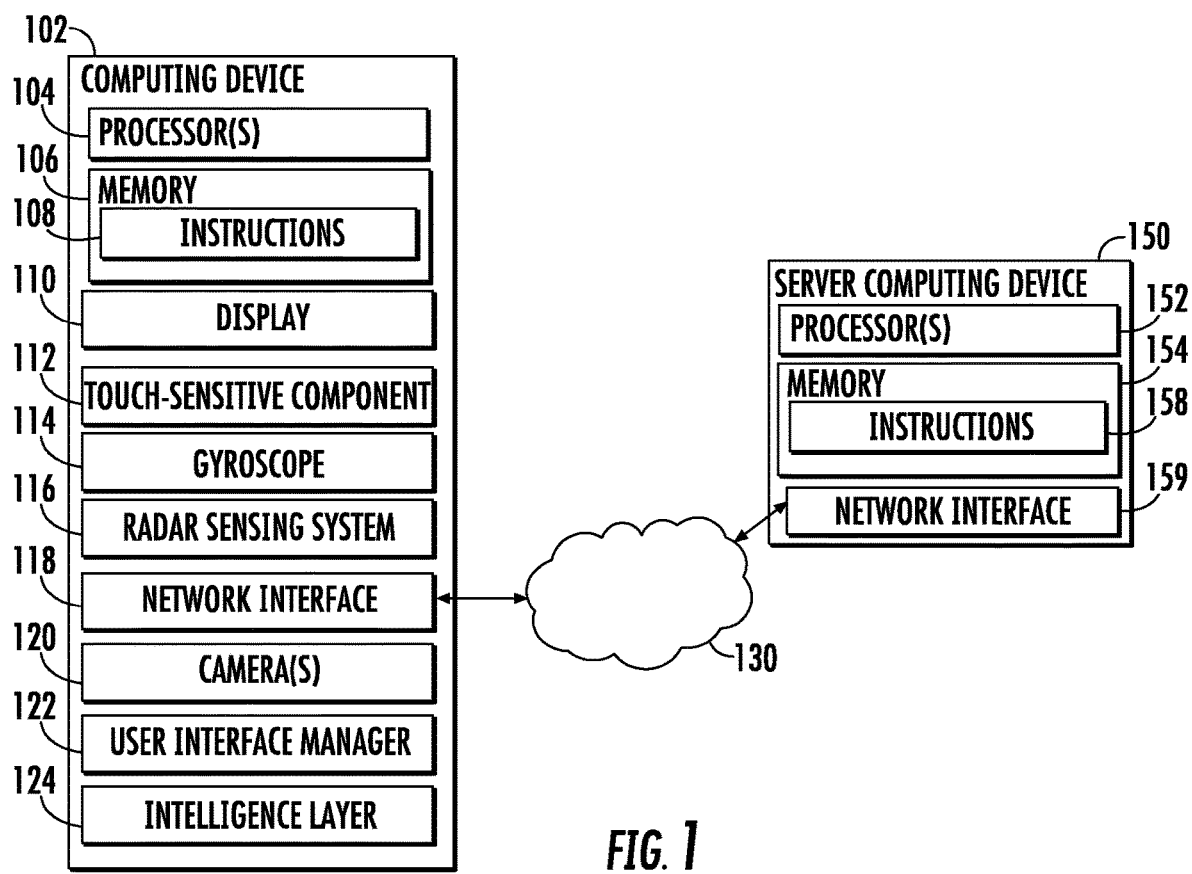
FIG. 1 depicts a block diagram of an example computing system according to example embodiments of the present disclosure.

Example aspects of the present disclosure are directed to systems and methods to improve discoverability of selectable user interface elements. In particular, the present disclosure provides computing devices that, in some implementations, intelligently identify user interface elements that are selectable (e.g., based on intelligent understanding of the user interface content) and visually modify one or more of such selectable user interface elements to indicate to the user that they are selectable. The visual modification can highlight or otherwise draw attention to the user interface element(s), thereby improving their discoverability. Moreover, this can be achieved without highlighting or otherwise drawing attention to the user interface element(s) all of the time, so that the readability etc. of the user interface element(s) is not negatively affected other than when the highlighting etc. is provided. For instance, in some implementations, user interface element(s) can be provided without any highlighting when the computing device is in a normal reading position, whereby the user can consume the content displayed on the display without their experience being affected by highlighting, and the computing device can then provide the user interface element(s) with highlighting when the computing device is tilted sideways away from the normal reading position, whereby the user can identify the selectable user interface element(s) at a time when they are less concentrating on consuming the content displayed on the display.

Furthermore, in some implementations, a computing device can visually modify a user interface element based on or as a function of a location of a user object (e.g., finger, stylus, face, etc.) relative to a display of the device and/or an orientation of the device (e.g., orientation relative to the ground and/or orientation relative to a user object). One example visual modification of a user interface element can include visually modifying the user interface element to have a gleam appearance in which the user interface element appears to reflect light. For example, a reflection location at which light appears to be reflected can be updated in real time based on or as a function of the location of the user object relative to the display of the device and/or the orientation of the device. By changing a reflection location as a function of the location of the user object relative to the display of the device and/or the orientation of the device, the effect of movement can be provided. This helps to focus the user's attention on the user interface element because humans notice movement more readily than they notice relatively static imagery. This allows the user's attention to be drawn to the user interface element with relatively little adaptation of the static content of the user interface element, allowing the user more readily to view/consume the static content of the user interface element for a given amount of attraction of the user's attention to the user interface element.

Thus, according to aspects of the present disclosure, a computing device can intelligently recognize content on the device's screen that is related to one or more entities and can inform the user that the user interface elements that correspond to such content are selectable to trigger additional actions (e.g., searching for, storage of, and/or communication of information associated with a corresponding entity). In one particular example, a text message received by the computing device from a contact of the user can include a picture of a food dish the contact cooked. An intelligence layer of the computing device can, upon presentation of the picture within the user interface, automatically recognize the food dish and ascertain that additional information (e.g., a recipe for the food dish) can be accessed, stored, communicated, etc. The computing device can visually modify the picture of the food dish (e.g., to have a gleam appearance) so that the user discovers the ability to select the picture to cause access, storage, or communication of the information (e.g., recipe). In such fashion, user access to and use of intelligent content-recognition and information provisioning systems can be increased, thereby enhancing user satisfaction. Furthermore, since user access to information can be streamlined in such fashion, the number of redundant requests, queries, searches, or other actions across multiple different applications can be reduced, thereby providing savings of computational and network resources.

More particularly, a computing device can provide a user interface that includes a plurality of user interface elements for presentation on the display. For example, the user interface can be a user interface generated by an application of the computing device. As examples, user interface elements can include icons, buttons, textual elements, items of content, pictures (e.g., pictures being captured in real-time via a camera and/or previously captured pictures), banners, titles, headers, entry fields, windows, menus, controls, graphics, and/or the like.

As one example user interface, a web browser application can provide a user interface that includes a web page that includes a number of user interface elements. As another example, a text messaging application can provide a user interface that includes text messages sent and/or received to one or more contacts. As yet another example, a camera application can provide a user interface that depicts a field of view of a camera of the computing device. Many other and different user interfaces can be provided as well.

According to another aspect of the present disclosure, the computing device can identify one or more of the user interface elements that are selectable by a user of the computing device. For example, in some implementations, the computing device can include a user interface manager. In some implementations, the user interface manager can be separate from whichever component (e.g., application) generated the user interface. The user interface manager can continuously or periodically analyze the user interface that is currently or about to be displayed by the computing device to identify user interface elements that are or should be selectable by the user of the computing device.

According to an aspect of the present disclosure, in some implementations, identifying the one or more of the user interface elements that are selectable can include employing an artificial intelligence layer to recognize entities within the user interface. More particularly, in some implementations, a computing device can include an artificial intelligence layer that automatically and intelligently identifies user interface elements (e.g., certain items of content) within a user interface that correspond to certain entities. As examples, entities can include locations, points of interest, persons, objects, products (e.g., articles of clothing, food items, etc.), brands, programming content (e.g., movies), bands, events, and/or other people, places, or things.

In some implementations, the artificial intelligence layer can perform mobile vision techniques to recognize entities in imagery included in the user interface and/or text recognition techniques to recognize entities in text included in the user interface. In some implementations, the artificial intelligence layer can include one or more machine-learned models. As examples, the machine-learned models can include machine-learned image recognition models, machine-learned object detection or recognition models, machine-learned facial detection or recognition models, machine-learned text recognition models, and/or various other types of machine-learned models that are useful for recognizing and understanding entities included in user interface content.

To provide an example of the above-described concepts, a web browser application can provide a user interface that includes a web page, such as, for example, a style magazine web page. The user interface manager can handle and manage presentation of the user interface within a display, including analyzing the user interface to identify user interface elements that are or should be selectable by the user. In particular, the artificial intelligence layer can scan the style magazine web page to identify any content that corresponds to entities. For example, the artificial intelligence layer can use a machine-learned object recognition model to recognize certain articles of clothing (e.g., a particular model of watch manufactured by a particular brand) that are depicted in the style magazine web page. The user interface manager can identify user interface elements (e.g., a picture that includes the watch) that correspond to the recognized articles of clothing (e.g., the watch) and can, upon presentation of the style magazine web page in the user interface, cause the identified user interface elements (e.g., the picture of the watch or a portion thereof that includes the watch) to be selectable by the user. For example, as will be described further below, selection of the user interface element that corresponds to the watch can result in the computing device performing various actions, such as, for example storing information about the watch, redirecting the user to a shopping web page that enables purchase of the watch, pinning the watch to the user's style board, and/or various other actions.

In some implementations, identifying user interface elements that are selectable can include generating additional user interface elements for presentation within the user interface and/or transforming a certain user interface element into a multiple user interface elements. To continue the example above, once the watch has been recognized in the picture included in the style magazine web page, the computing device can generate an additional user interface element that corresponds to the portion of the picture that includes the watch, if no such user interface element existed previously. Thus, new and/or modified user interface elements can be used to enable the user to select certain specific entities (e.g., the watch) included in a larger group of entities (e.g., six different articles of clothing recognized in the picture included in the style magazine web page).

In some implementations, identifying user interface elements that are selectable can include accessing attributes or parameters associated with the user interface elements. For example, in some instances, the component (e.g., application) that generated the user interface can provide attribute or parameter data for each user interface element included in the user interface, including, for example, data that indicates whether each user interface element is selectable. Thus, the user interface manager can access or read this data to identify which of the user interface elements are selectable.

According to another aspect of the present disclosure, the computing device can visually modify at least a first user interface element of the one or more selectable user interface elements. As an example, in some implementations, all of the user interface elements that are selectable by the user can be visually modified. In other implementations, only a subset of the selectable user interface elements can be visually modified (e.g., based on various contextual data as described below).

In some implementations, the computing device can visually modify the one or more user interface elements as soon as elements load within the user interface (e.g., as soon as the application, web page, etc. being displayed loads). In other implementations, the computing device can wait to visually modify the one or more user interface elements until some other event occurs such as, for example, when a user invokes the keyboard, when the user performs a scrolling action, when the user reaches an end of the current interface or page, and/or other actions or events.

According to an aspect of the present disclosure, one example visual modification that the computing device can perform is to visually modify a user interface element to have a gleam appearance in which the user interface element appears to reflect light. For example, the gleam appearance can visually mimic the appearance of sun reflecting off of a watch face, a body of water, or other reflective item. Visually modifying a user interface element to have a gleam appearance can bring the user's attention to the user interface element and the fact that it is selectable.

Another example visual modification includes outlining the user interface element. Another example visual modification includes changing the color of the user interface element. Another example visual modification includes highlighting the user interface element by brightening the user interface element and/or an area around the user interface element. For example, a flashing of a highlighting color, shading, and/or texture on and/or around the user interface element can indicate that the user interface element is selectable.

According to another aspect of the present disclosure, in some implementations, the visual modification can be based on an orientation of the device. For example, the visual modification can change in response to a change in the orientation of the device.

As one example, the orientation of the device can be an orientation relative to a direction of gravity (e.g., the direction towards the ground). For example, in some implementations, the computing device can include a gyroscope. The gyroscope can provide data that indicates the orientation of the device relative to the direction of gravity. The gyroscope can include one or more moving (e.g., spinning) components or can include only static components. As one example, the gyroscope can include an arrangement of accelerometers (e.g., three or more accelerometers arranged to detect acceleration in three dimensions).

As another example, the orientation of the device can be an orientation relative to a user object. The user object can be positioned in a number of different positions relative to the device. As one example, in some instances, the user object can hover over the display. That is, the user object can be placed adjacent to the display but not physically touching the display.

For example, the user object can be a finger or stylus associated with the user. For example, the finger or stylus can be located at a number of different locations relative to a display of the computing device, including, for example, hovering over the display as described above. In some implementations, the computing device can include a RADAR sensing system. The computing device can use the RADAR sensing system to determine an object location of the user object (e.g., finger or stylus). The computing device can determine the orientation of the computing device relative to the user object based on the determined object location. The visual modification of the user interface element can be modified (e.g., in real time) as such orientation changes.

In another example, the user object can be a face of the user. In some implementations, the computing device can include one or more cameras. The computing device can determine a face location of the user's face based on imagery captured by the one or more cameras. The computing device can determine the orientation of the computing device relative to the user's face based on the determined face location. The visual modification of the user interface element can be modified (e.g., in real time) as such orientation changes.

As one example, visually modifying a user interface element based on the orientation of the device can include, for a user interface element with a gleam appearance, changing a reflection location at which the user interface element appears to reflect light based at least in part on the orientation of the display relative to the object location of the user object. Thus, in one example, as the orientation of the device changes (e.g., due to the user tilting the device and/or moving her finger around the display) the reflection location can be updated, further giving the appearance that the user interface element is gleaming with light.

As another example, visually modifying the user interface element based on the orientation can include visually modifying the user interface element at certain orientations but not at other orientations. Thus, in one example, if the user tilts the device to the right or left, the user interface object can be visually modified, while if the user holds the device in a neutral orientation, the user interface object is not visually modified.

In some implementations, the visual modification can only be temporary in nature. In one example, as soon as a user interface (e.g., web page) loads, the computing device can briefly (e.g., for one half second) visually modify the selectable user interface elements (e.g., recognized products) and then return the elements to a neural or normal state. This can provide a quick indication to the user of which elements are selectable without being overly disruptive of the user experience.

In some implementations, the particular type of visual modification used for a user interface element can be based on or a function of a content type associated with such user interface element. For example, textual elements can be modified in a first way while pictorial or graphical elements can be modified in a second, different way.

According to another aspect of the present disclosure, in some implementations, the visual modification can be based on a location of user object to the display of the computing device. As one example, the computing device can visually modify a selectable user interface element when the user object is hovering over the user interface element. Thus, for example, a user may use her finger to hover over the display of the device. When the user's finger is located over (or within a certain distance of) a user interface element that is selectable, the computing device can visually modify such user interface element (e.g., using any combination of one or more of the visual modifications described herein).

Thus, a user may hover her finger over the display screen and move her finger to different locations to discover (e.g., via the resulting visual modification of the user interface elements) which of the user interface elements are selectable. The location of the user object (e.g., finger) relative to the display screen can be identified in any number of ways including, for example, use of cameras and/or the RADAR sensing system as described elsewhere herein.

In some instances, the computing device can receive a user input (e.g., a user touch input) from the user object that selects a user interface element (e.g., a user interface element that is being visually modified). For example, a touch or tap input can be used to select a user interface element.

In some implementations, in response to the user input, the computing device can provide a second user interface for presentation on the display. For example the second user interface can enable the user to search, store for later retrieval, or communicate information associated with the selected user interface element.

Thus, aspects of the present disclosure provide streamlined search, storage, and retrieval of information associated with various entities. In particular, when combined with the artificial intelligence layer described herein, the present disclosure provides a holistic system that automatically and intelligently identifies content within a user interface that corresponds to certain entities and, using the visual modification techniques described herein, actively alerts the user regarding the ability to select a user interface element corresponding to such content/entities to perform advanced information handling procedures.

The systems and methods of the present disclosure provide a number of technical effects and benefits. As one example, technical effect and benefit, by streamlining the information storage and retrieval process, the number of redundant requests, queries, searches, or other actions across multiple different applications can be reduced, thereby providing savings of computational and network resources. In particular, to continue the example above with respect to the style magazine web page, if the user is interested in shopping for the watch, the user can discover the user interface element that corresponds to the watch (e.g., as a result of visual modification of such interface element) and, with a small number of inputs, receive additional information about the watch. This is in contrast to previous systems in which the user would have been required to perform a web search for the watch, which may include several different iterations of search queries and results due to the inexact nature of web searching and/or the user's lack of explicit knowledge of the watch product name. These redundant and/or un-fruitful searches increase web traffic and consume both device and server resources. By providing streamlined and discoverable information retrieval systems, the systems and methods of the present disclosure eliminate such redundant and/or un-fruitful searches and, therefore, conserve processing, memory, and network bandwidth resources.

With reference now to the Figures, example embodiments of the present disclosure will be discussed in further detail.

Example Devices and Systems

FIG. 1 depicts a block diagram an example computing system according to example embodiments of the present disclosure. The system includes a computing device 102 that performs aspects of the present disclosure. The computing device 102 can be communicatively coupled to a server computing device 150 over a network 130.

The computing device 102 can be any form of device, such as mobile computing device (e.g., a smartphone, tablet, computing device that is able to be worn (e.g., computing device embedded in a pair of eyeglasses, a wristband, a necklace, etc.), handheld computing device, etc.), computing device embedded in a vehicle, home appliance, or other system, smart speaker, laptop, desktop, gaming console, etc.

The computing device 102 includes one or more processors 104 and a memory 106. The one or more processors 104 can be any form of processing device, including, for example, a processing unit, a microprocessor, a controller, a microcontroller, an application specific integrated circuit, etc. The memory 106 can include one or more of any non-transitory computer-readable medium, including, for example, RAM (e.g., DRAM), ROM (e.g., EEPROM), optical storage, magnetic storage, flash storage, solid-state storage, hard drives, or some combination thereof. The memory 106 can store one or more sets of instructions 108 that, when executed by the computing device 102, cause the computing device 102 to perform operations consistent with the present disclosure.

The computing device 102 can further include a network interface 118 and a display 110. The network interface 118 can enable communications over the network 130. The network interface 118 can include any number of components to provide networked communications (e.g., transceivers, antennas, controllers, cards, etc.).

The display 110 can include different types of display components, such as, for example, a light-emitting diode display (e.g., organic light-emitting diode display), a liquid-crystal display (e.g., thin-film-transistor liquid-crystal display), a thin-film diode display, etc. In some implementations, the display 110 can also be touch-sensitive. For example, the display 110 can be a capacitive touchscreen, a resistive touchscreen, or other touch-sensitive technologies. Thus, in some implementations, the display 110 can serve as or be the touch-sensitive component 112. In other implementations, the computing device 102 can have an additional or alternative touch-sensitive component 112 that is separate and distinct from the display 110. For example, the touch-sensitive component 112 can be a touch pad or the like.

In some implementations, the computing device 102 can also include a gyroscope 114. The gyroscope 114 can provide data that indicates the orientation of the device 102 relative to the direction of gravity (e.g., towards the ground). The gyroscope 114 can include one or more moving (e.g., spinning) components or can include only static components. As one example, the gyroscope 114 can include an arrangement of accelerometers (e.g., three or more accelerometers arranged to detect acceleration in three dimensions).

In some implementations, the computing device 102 can also include a radio detection and ranging (RADAR) sensing system 116. The computing device 102 can use the RADAR sensing system 116 to determine an object location of the user object (e.g., finger or stylus). For example, the RADAR sensing system 116 can emit and receive radio waves to determine the range, angle, or velocity of objects near the computing device 102.

In some implementations, the RADAR sensing system 116 can work by emitting electromagnetic waves in a broad beam. Objects within the beam scatter this energy, reflecting some portion back towards the RADAR antenna. Properties of the reflected signal, such as energy, time delay, and frequency shift capture rich information about the object's characteristics and dynamics, including size, shape, orientation, material, distance, and velocity.

In some implementations, the RADAR sensing system 116 can track and recognize dynamic gestures expressed by fine motions of the fingers and hand. In order to accomplish this with a single chip sensor, in some implementations, unlike traditional radar sensors, the RADAR sensing system 116 does not require large bandwidth and high spatial resolution. In particular, in some implementations, the fundamental sensing principles of the RADAR sensing system 116 can rely on motion resolution by extracting subtle changes in the received signal over time. By processing these temporal signal variations, the RADAR sensing system 116 can distinguish complex finger movements and deforming hand shapes within its field.

In some implementations, the RADAR sensing system 116 can include a sensor and antenna array in an ultra-compact 8 mm×10 mm package and can operate in the 60-GHz ISM band. Two example modulation architectures that can be used are a Frequency Modulated Continuous Wave (FMCW) RADAR and a Direct-Sequence Spread Spectrum (DSSS) RADAR. Both of these can integrate the entire RADAR system into the package, including multiple beamforming antennas that enable 3D tracking and imaging with no moving parts. In other implementations, the RADAR sensing system 116 can have different designs and/or operating principles to those examples described above.

In some implementations, the computing device 102 can include one or more cameras 120. For example, the cameras 120 can include front-facing cameras, rear-facing cameras, periscopic cameras, and/or configurations. The cameras 120 can include visible spectrum cameras, infrared cameras, or other forms of devices that capture imagery. The computing device 102 can perform various image processing and/or computer vision techniques to understand or process the content of the captured imagery.

In some implementations, the computing device 102 can include a user interface manager 122 that controls or manages presentation of a user interface on the display 110, including, for example, tasks like presenting the user interface, modifying the user interface, receiving user input directed to the user interface, etc. In some implementations, the user interface manager 122 can be included in an application that generates the user interface. In other implementations, the user interface manager can be separate from whichever component (e.g., application) generated the user interface. In some implementations, the user interface manager 122 can be an aspect or component of an operating system of the computing device 102.

According to an aspect of the present disclosure, in some implementations, the user interface manager 122 can continuously or periodically analyze the user interface that is currently or about to be displayed by the computing device 102 to identify user interface elements that are or should be selectable by the user of the computing device 102. For example, the user interface manager 122 can perform some or all of the steps of methods 200 and 500 described with reference to FIGS. 2 and 5 below.

Furthermore, in some implementations, the computing device 102 can include an artificial intelligence layer 124. The artificial intelligence layer 124 can recognize entities within the user interface. More particularly, in some implementations, the artificial intelligence layer 124 can automatically and intelligently identify user interface elements (e.g., certain items of content) within the user interface that correspond to certain entities. As examples, entities can include locations, points of interest, persons, objects, products (e.g., articles of clothing, food items, etc.), brands, programming content (e.g., movies), bands, events, and/or other people, places, or things.

In some implementations, the artificial intelligence layer 124 can perform mobile vision techniques to recognize entities in imagery included in the user interface and/or text recognition techniques to recognize entities in text included in the user interface. In some implementations, the artificial intelligence layer 124 can include one or more machine-learned models. As examples, the machine-learned models can include machine-learned image recognition models, machine-learned object detection or recognition models, machine-learned facial detection or recognition models, machine-learned text recognition models, and/or various other types of machine-learned models that are useful for recognizing and understanding entities included in user interface content. These machine-learned models can, in some implementations, include artificial neural networks. Example artificial neural networks include feed-forward neural networks, recurrent neural networks, and convolutional neural networks. Neural networks can be deep neural networks.

In some implementations, the artificial intelligence layer 124 can be included in an application that generates the user interface. In other implementations, the artificial intelligence layer 124 can be separate from whichever component (e.g., application) generated the user interface. In some implementations, the artificial intelligence layer 124 can be an aspect or component of an operating system of the computing device 102.

Each of the user interface manager 122 and the artificial intelligence layer 124 can include computer logic utilized to provide desired functionality. Each of the user interface manager 122 and the artificial intelligence layer 124 can be implemented in hardware, firmware, and/or software controlling a general purpose processor. For example, in some implementations, each of the user interface manager 122 and the artificial intelligence layer 124 includes program files stored on a storage device, loaded into a memory and executed by one or more processors. In other implementations, each of the user interface manager 122 and the artificial intelligence layer 124 includes one or more sets of computer-executable instructions that are stored in a tangible computer-readable storage medium such as RAM hard disk or optical or magnetic media.

In some implementations, the computing device 102 can communicatively connect to a server computing device 150 over the network 130. The server computing device 150 can include one or more processors 152 and a memory 154. The one or more processors 152 can be any form of processing device, including, for example, a processing unit, a microprocessor, a controller, a microcontroller, an application specific integrated circuit, etc. The memory 154 can include one or more of any non-transitory computer-readable medium, including, for example, RAM (e.g., DRAM), ROM (e.g., EEPROM), optical storage, magnetic storage, flash storage, solid-state storage, hard drives, or some combination thereof. The memory 154 can store one or more sets of instructions 156 that, when executed by the server computing device 150, cause the server computing device 150 to perform operations consistent with the present disclosure.

The server computing device 150 can further include a network interface 159. The network interface 159 can enable communications over the network 130. The network interface 159 can include any number of components to provide networked communications (e.g., transceivers, antennas, controllers, cards, etc.).

The network 130 can be any type of communications network, such as a local area network (e.g., intranet), wide area network (e.g., Internet), or some combination thereof and can include any number of wired or wireless links. In general, communication between the server computing device 150 and the computing device 102 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). Server computing device 150 can communicate with the computing device 102 over network 130 by sending and receiving data.

Further, any of the processes, operations, programs, applications, or instructions described as being stored at or performed by the server computing device 150 can instead be stored at or performed by the computing device 102 in whole or in part, and vice versa.

Example Methods

Figure 2:
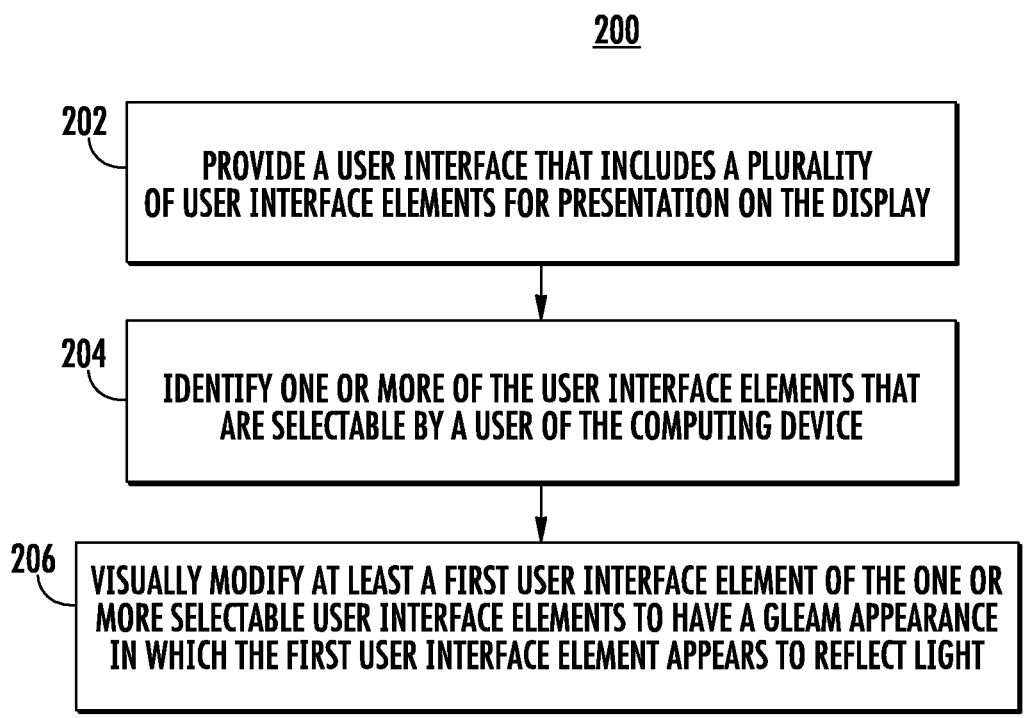
FIG. 2 depicts a flow chart diagram of an example method to increase discoverability of selectable user interface elements according to example embodiments of the present disclosure.

FIG. 2 depicts a flow chart diagram of an example method 200 to increase discoverability of selectable user interface elements according to example embodiments of the present disclosure.

At 202, a computing device can provide a user interface that includes a plurality of user interface elements for presentation on a display. For example, the user interface can be a user interface generated by an application of the computing device. As examples, user interface elements can include icons, buttons, textual elements, items of content, pictures (e.g., pictures being captured in real-time via a camera and/or previously captured pictures), banners, titles, headers, entry fields, windows, menus, controls, graphics, and/or the like.

As one example user interface, a web browser application can provide a user interface that includes a web page that includes a number of user interface elements. As another example, a text messaging application can provide a user interface that includes text messages sent and/or received to one or more contacts. As yet another example, a camera application can provide a user interface that depicts a field of view of a camera of the computing device. Many other and different user interfaces can be provided as well.

At 204, the computing device can identify one or more of the user interface elements that are selectable by a user of the computing device. For example, in some implementations, the computing device can include a user interface manager. In some implementations, the user interface manager can be separate from whichever component (e.g., application) generated the user interface. The user interface manager can continuously or periodically analyze the user interface that is currently or about to be displayed by the computing device to identify user interface elements that are or should be selectable by the user of the computing device.

According to an aspect of the present disclosure, in some implementations, identifying the one or more of the user interface elements that are selectable at 204 can include employing an artificial intelligence layer to recognize entities within the user interface. More particularly, in some implementations, a computing device can include an artificial intelligence layer that automatically and intelligently identifies user interface elements (e.g., certain items of content) within a user interface that correspond to certain entities. As examples, entities can include locations, points of interest, persons, objects, products (e.g., articles of clothing, food items, etc.), brands, programming content (e.g., movies), bands, events, and/or other people, places, or things.

In some implementations, the artificial intelligence layer can perform mobile vision techniques at 204 to recognize entities in imagery included in the user interface and/or text recognition techniques to recognize entities in text included in the user interface. In some implementations, the artificial intelligence layer can include one or more machine-learned models. As examples, the machine-learned models can include machine-learned image recognition models, machine-learned object detection or recognition models, machine-learned facial detection or recognition models, machine-learned text recognition models, and/or various other types of machine-learned models that are useful for recognizing and understanding entities included in user interface content.

In some implementations, identifying user interface elements that are selectable at 204 can include generating additional user interface elements for presentation within the user interface and/or transforming a certain user interface element into a multiple user interface elements. Thus, new and/or modified user interface elements can be used to enable the user to select certain specific entities included in a larger group of entities.

In some implementations, identifying user interface elements that are selectable at 204 can include accessing attributes or parameters associated with the user interface elements. For example, in some instances, the component (e.g., application) that generated the user interface can provide attribute or parameter data for each user interface element included in the user interface, including, for example, data that indicates whether each user interface element is selectable. Thus, the user interface manager can access or read this data to identify which of the user interface elements are selectable.

At 206, the computing device can visually modify at least a first user interface element of the one or more selectable user interface elements. As an example, in some implementations, all of the user interface elements that are selectable by the user can be visually modified at 206. In other implementations, only a subset of the selectable user interface elements can be visually modified at 206 (e.g., based on various contextual data as described elsewhere herein).

In some implementations, at 206, the computing device can visually modify the one or more user interface elements as soon as elements load within the user interface (e.g., as soon as the application, web page, etc. being displayed loads). In other implementations, the computing device can wait to visually modify the one or more user interface elements until some other event occurs such as, for example, when a user invokes the keyboard, when the user performs a scrolling action, when the user reaches an end of the current interface or page, and/or other actions or events.

One example visual modification that the computing device can perform at 206 is to visually modify a user interface element to have a gleam appearance in which the user interface element appears to reflect light. For example, the gleam appearance can visually mimic the appearance of sun reflecting off of a watch face, a body of water, or other reflective item. Visually modifying a user interface element to have a gleam appearance can bring the user's attention to the user interface element and the fact that it is selectable.

Another example visual modification includes outlining the user interface element (e.g., using a bolder or darker outline or shadowbox than previously used). Another example visual modification includes changing the color of the user interface element. Another example visual modification includes highlighting the user interface element by brightening the user interface element and/or an area around the user interface element. For example, a flashing of a highlighting color, shading, and/or texture on and/or around the user interface element can indicate that the user interface element is selectable.

According to another aspect of the present disclosure, in some implementations, the visual modification performed at 206 can be based on an orientation of the device. For example, the visual modification can change in response to a change in the orientation of the device.

As one example, visually modifying a user interface element based on the orientation of the device can include, for a user interface element with a gleam appearance, changing a reflection location at which the user interface element appears to reflect light based at least in part on the orientation of the device. Thus, in one example, as the orientation of the device changes the reflection location can be updated, further giving the appearance that the user interface element is gleaming with light.

As another example, visually modifying the user interface element based on the orientation can include visually modifying the user interface element at certain orientations but not at other orientations. Thus, in one example, if the user tilts the device to the right or left, the user interface object can be visually modified, while if the user holds the device in a neutral orientation, the user interface object is not visually modified.

Figure 3B:
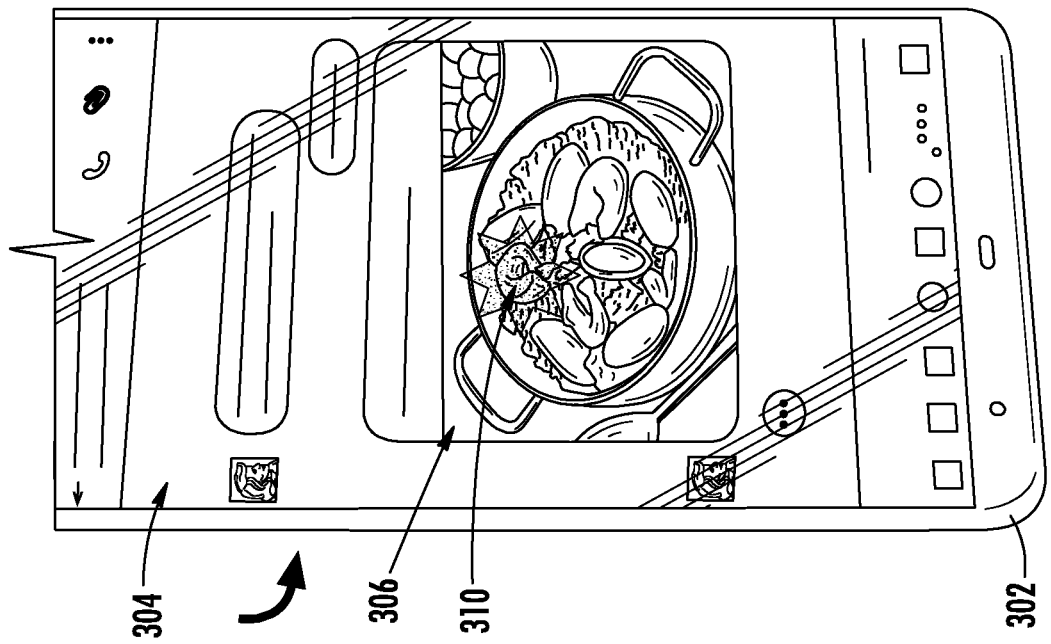
FIGS. 3A and 3B depict an example modification of an example user interface element based on an orientation of an example computing device according to example embodiments of the present disclosure.

In some implementations, the orientation of the device can be an orientation relative to a direction of gravity (e.g., the direction towards the ground). As one example, FIGS. 3A and 3B depict an example modification of an example user interface element based on an orientation of an example computing device relative to the direction of gravity according to example embodiments of the present disclosure.

Figure 3A:
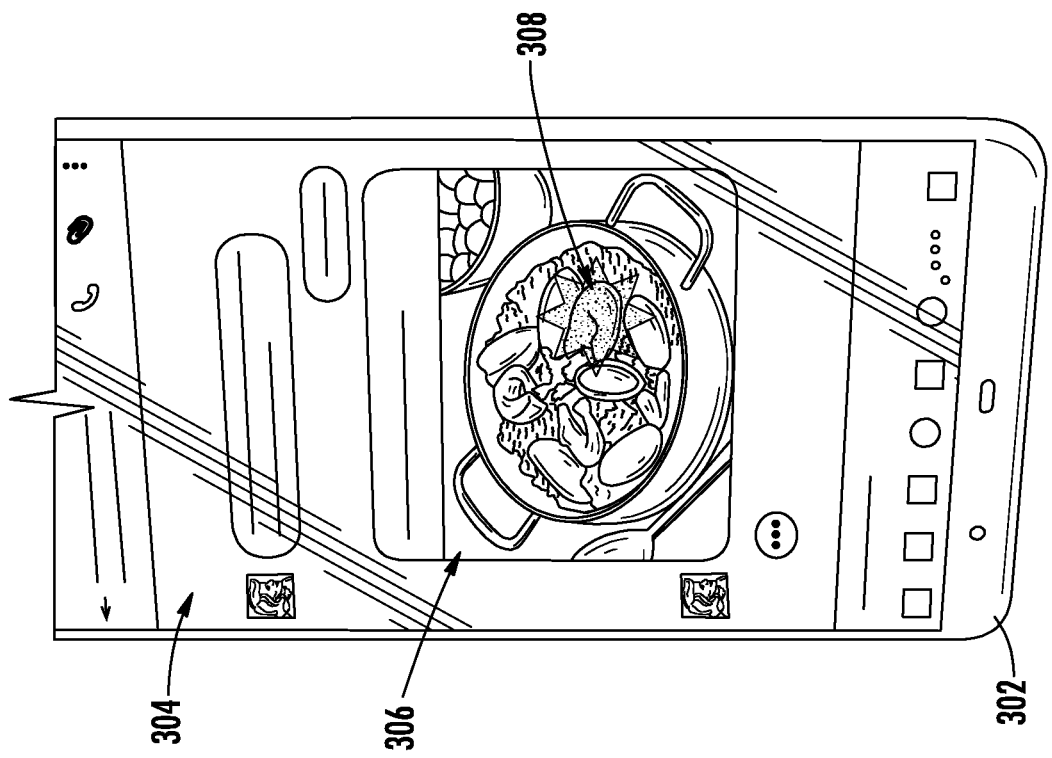

In particular, in FIG. 3A, a mobile computing device 302 has a first orientation (e.g., tilted slightly to the left). The computing device 302 is displaying a user interface 304. The user interface 304 includes a number of different user interface elements. As an example, the user interface 304 includes a user interface element 306. The user interface element 306 is a picture of a food dish. The user interface element 306 is selectable by the user (e.g., to receive additional information about the food dish).

To alert the user to the fact that the user interface element 306 is selectable, the computing device 302 can visually modify the user interface element 306. In particular, the computing device 302 can modify the element 306 to have a gleam appearance in which the user interface element 306 appears to reflect light.

In particular, the computing device 302 can determine a reflection location 308 based on the orientation of the device 302. The reflection location 308 can be the location at which the element 306 is modified to appear as most reflective of light. Thus, for example, the element 306 can be modified to have a gleam or glare at the reflection location 308.

Some or all of the element 306 can be modified. For example, as illustrated in FIG. 3A, only a portion has been visually modified to have a gleam. However, in other instances, the entirety of the element 306 can be modified to have the gleam. For example, the entirety of the element 306 can gleam, but the gleam can be brightest at the reflection location 308.

According to an aspect of the present disclosure, the visual modification of the element 306 can change over time as the orientation of the device 302 changes. In particular, in FIG. 3B, the orientation of the device 302 has changed so that the device is tilting slightly to the right. As a result, the visual modification can change. In particular, the computing device 302 can change the reflection location of the gleam appearance as the orientation of the device 302 changes. For example, at the device orientation of FIG. 3B, the reflection location has moved to a new location 310.

As one example, the reflection location can slide from location 308 in FIG. 3A to location 310 in FIG. 3B as the orientation of the device 302 changes from FIG. 3A to FIG. 3B. Likewise, the reflection location can slide back to location 308 if the orientation of the device 302 returns to the orientation of FIG. 3A. Thus, the reflection location can be updated in real time based on the orientation of the device relative to the ground, thus causing the user interface element to gleam with light.

Referring again to FIG. 2, as another example of the modification performed at 206 based on the orientation of the device, the orientation of the device can be an orientation relative to a user object. The user object can be positioned in a number of different positions relative to the device. As one example, in some instances, the user object can hover over the display. That is, the user object can be placed adjacent to the display but not physically touching the display.

For example, the user object can be a finger or stylus associated with the user. For example, the finger or stylus can be located at a number of different locations relative to a display of the computing device, including, for example, hovering over the display as described above. In some implementations, the computing device can include a RADAR sensing system. The computing device can use the RADAR sensing system to determine an object location of the user object (e.g., finger or stylus). The computing device can determine the orientation of the computing device relative to the user object based on the determined object location. The visual modification of the user interface element can be modified (e.g., in real time) as such orientation changes.

In another example, the user object can be a face of the user. In some implementations, the computing device can include one or more cameras. The computing device can determine a face location of the user's face based on imagery captured by the one or more cameras. The computing device can determine the orientation of the computing device relative to the user's face based on the determined face location. The visual modification of the user interface element can be modified (e.g., in real time) as such orientation changes.

Figure 4A:
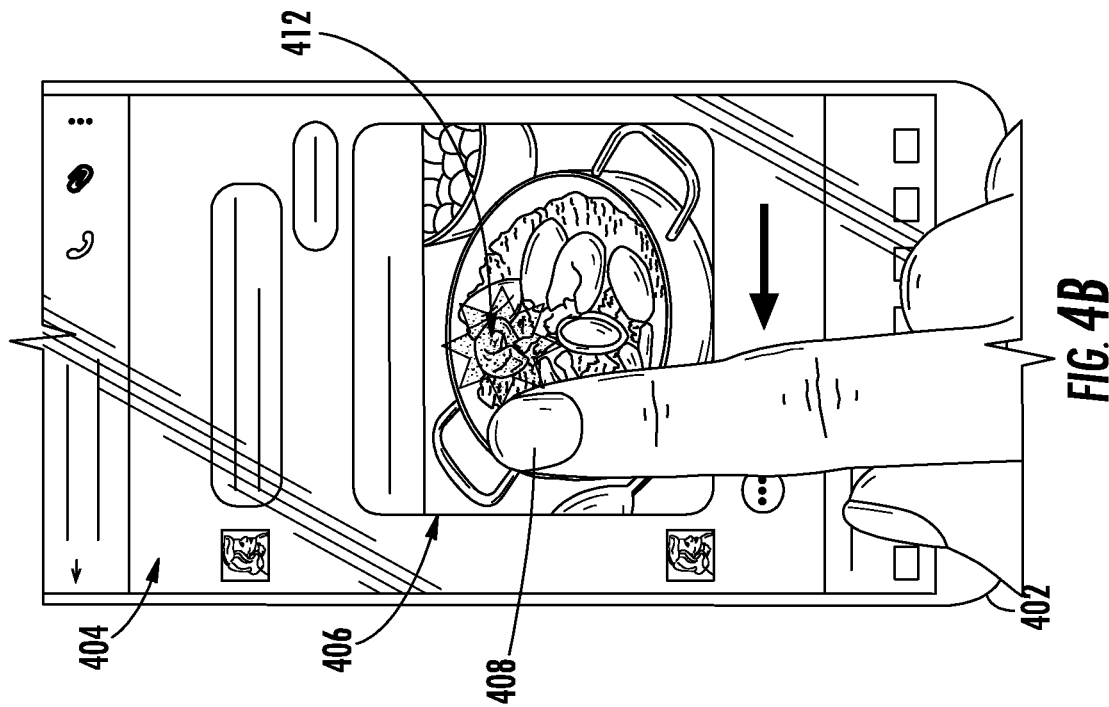
FIGS. 4A and 4B depict an example modification of an example user interface element based on an orientation of an example computing device relative to an example user object according to example embodiments of the present disclosure.
Figure 4B:
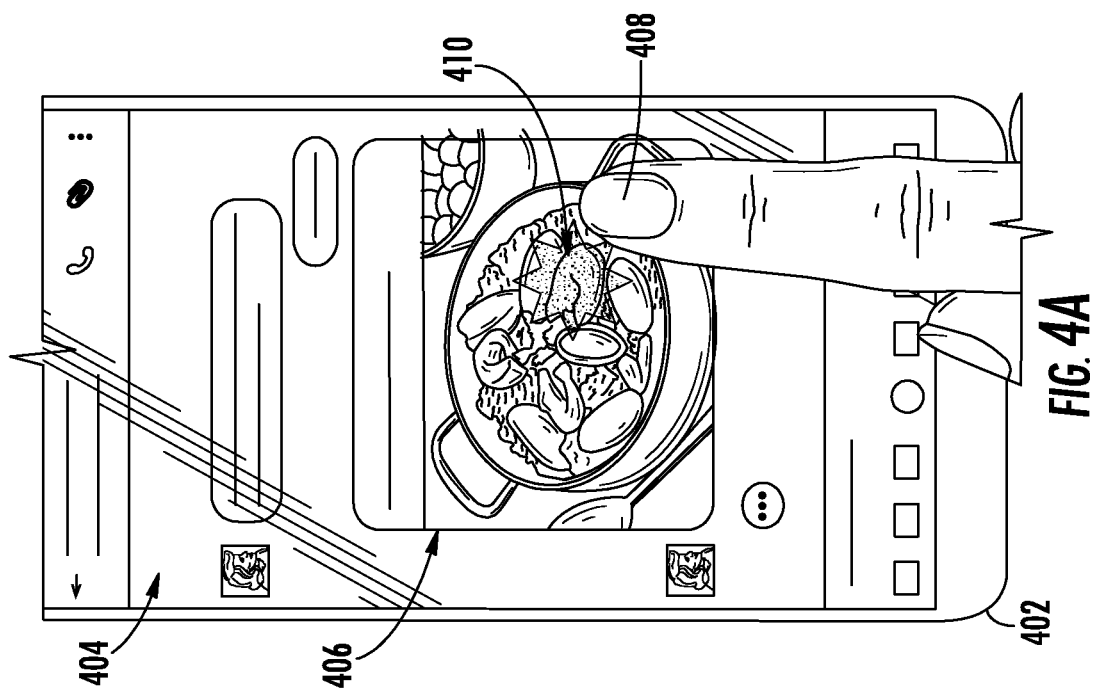

FIGS. 4A and 4B depict an example modification of an example user interface element based on an orientation of an example computing device relative to an example user object according to example embodiments of the present disclosure.

In particular, in FIG. 4A, a mobile computing device 402 has a first orientation relative to the location of a user's finger 408. The computing device 402 is displaying a user interface 404. The user interface 404 includes a number of different user interface elements. As an example, the user interface 404 includes a user interface element 406. The user interface element 406 is a picture of a food dish. The user interface element 406 is selectable by the user (e.g., to receive additional information about the food dish).

To alert the user to the fact that the user interface element 406 is selectable, the computing device 402 can visually modify the user interface element 406. In particular, the computing device 402 can modify the element 406 to have a gleam appearance in which the user interface element 406 appears to reflect light.

In particular, the computing device 402 can determine a reflection location 410 based on the orientation of the device 402 relative to the finger 408. The reflection location 410 can be the location at which the element 406 is modified to appear as most reflective of light. Thus, for example, the element 406 can be modified to have a gleam or glare at the reflection location 410.

Some or all of the element 406 can be modified. For example, as illustrated in FIG. 4A, only a portion has been visually modified to have a gleam. However, in other instances, the entirety of the element 406 can be modified to have the gleam. For example, the entirety of the element 406 can gleam, but the gleam can be brightest at the reflection location 410.

According to an aspect of the present disclosure, the visual modification of the element 406 can change over time as the orientation of the device 402 relative to the finger 408 changes. In particular, in FIG. 4B, the location of the finger 408 has changed, thereby resulting in a change in the orientation of the device 402 relative to the finger 408. As a result, the visual modification can change. In particular, the computing device 402 can change the reflection location of the gleam appearance as the orientation of the device 402 changes. For example, at the device orientation of FIG. 4B, the reflection location has moved to a new location 412.

As one example, the reflection location can slide from location 410 in FIG. 4A to location 412 in FIG. 4B as the orientation of the device 402 to the finger 408 changes from FIG. 4A to FIG. 4B. Likewise, the reflection location can slide back to location 410 if the orientation of the device 402 returns to the orientation of FIG. 4A. Thus, the reflection location can be updated in real time based on the orientation of the device relative to the finger 408, thus causing the user interface element 406 to gleam with light.

Referring again to FIG. 2, in some implementations, the visual modification performed at 206 can only be temporary in nature. In one example, as soon as a user interface (e.g., web page) loads, the computing device can briefly (e.g., for one half second) visually modify the selectable user interface elements (e.g., recognized products) and then return the elements to a neural or normal state. This can provide a quick indication to the user of which elements are selectable without being overly disruptive of the user experience.

In some implementations, the particular type of visual modification used for a user interface element at 206 can be based on or a function of a content type associated with such user interface element. For example, textual elements can be modified in a first way while pictorial or graphical elements can be modified in a second, different way.

Figure 5:
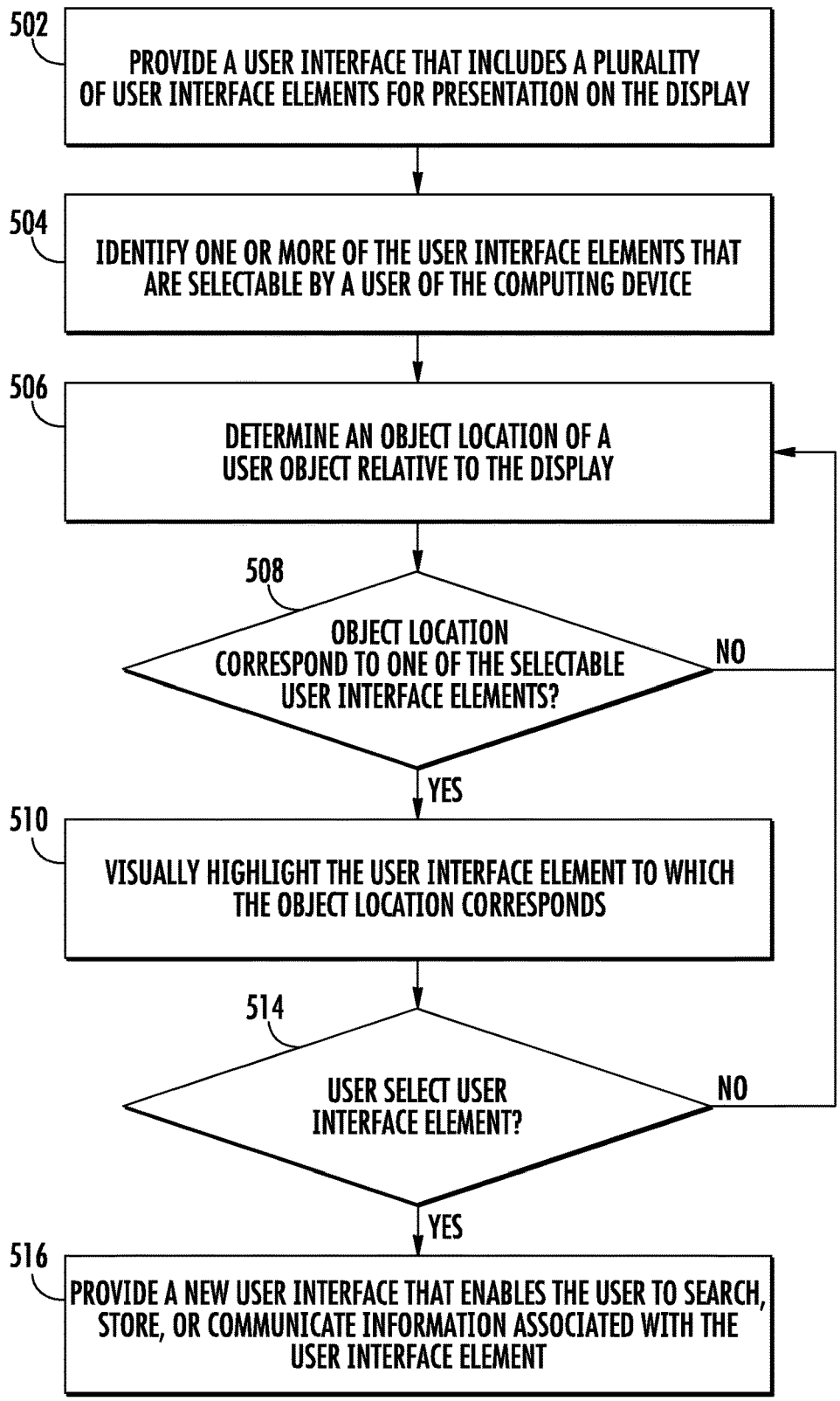
FIG. 5 depicts a flow chart diagram of an example method to increase discoverability of selectable user interface elements according to example embodiments of the present disclosure.

FIG. 5 depicts a flow chart diagram of an example method 500 to increase discoverability of selectable user interface elements according to example embodiments of the present disclosure.

At 502, a computing device can provide a user interface that includes a plurality of user interface elements for presentation on a display. For example, the user interface can be a user interface generated by an application of the computing device. As examples, user interface elements can include icons, buttons, textual elements, items of content, pictures (e.g., pictures being captured in real-time via a camera and/or previously captured pictures), banners, titles, headers, entry fields, windows, menus, controls, graphics, and/or the like.

As one example user interface, a web browser application can provide a user interface that includes a web page that includes a number of user interface elements. As another example, a text messaging application can provide a user interface that includes text messages sent and/or received to one or more contacts. As yet another example, a camera application can provide a user interface that depicts a field of view of a camera of the computing device. Many other and different user interfaces can be provided as well.

At 504, the computing device can identify one or more of the user interface elements that are selectable by a user of the computing device. For example, in some implementations, the computing device can include a user interface manager. In some implementations, the user interface manager can be separate from whichever component (e.g., application) generated the user interface. The user interface manager can continuously or periodically analyze the user interface that is currently or about to be displayed by the computing device to identify user interface elements that are or should be selectable by the user of the computing device.

According to an aspect of the present disclosure, in some implementations, identifying the one or more of the user interface elements that are selectable at 504 can include employing an artificial intelligence layer to recognize entities within the user interface. More particularly, in some implementations, a computing device can include an artificial intelligence layer that automatically and intelligently identifies user interface elements (e.g., certain items of content) within a user interface that correspond to certain entities. As examples, entities can include locations, points of interest, persons, objects, products (e.g., articles of clothing, food items, etc.), brands, programming content (e.g., movies), bands, events, and/or other people, places, or things.

In some implementations, the artificial intelligence layer can perform mobile vision techniques at 504 to recognize entities in imagery included in the user interface and/or text recognition techniques to recognize entities in text included in the user interface. In some implementations, the artificial intelligence layer can include one or more machine-learned models. As examples, the machine-learned models can include machine-learned image recognition models, machine-learned object detection or recognition models, machine-learned facial detection or recognition models, machine-learned text recognition models, and/or various other types of machine-learned models that are useful for recognizing and understanding entities included in user interface content.

In some implementations, identifying user interface elements that are selectable at 504 can include generating additional user interface elements for presentation within the user interface and/or transforming a certain user interface element into a multiple user interface elements. Thus, new and/or modified user interface elements can be used to enable the user to select certain specific entities included in a larger group of entities.

In some implementations, identifying user interface elements that are selectable at 504 can include accessing attributes or parameters associated with the user interface elements. For example, in some instances, the component (e.g., application) that generated the user interface can provide attribute or parameter data for each user interface element included in the user interface, including, for example, data that indicates whether each user interface element is selectable. Thus, the user interface manager can access or read this data to identify which of the user interface elements are selectable.

At 506, the computing device can determine an object location of a user object relative to the display. The object location can be a location in three-dimensional space. Alternatively, the object location can be a location in two-dimensional space relative to the X,Y coordinates of the display screen (e.g., the X,Y coordinates of the display screen that most closely match the object location.

As examples, the user object can be a finger of the user, a stylus controlled by the user, a face of the user, and/or other user objects. For example, the user object can be located adjacent to the display but not physically touching the display (i.e., hovering over the display)

In one example, determining the object location at 506 can include using a RADAR sensing system to determine the object location. In another example, determining the object location at 506 can include analyzing imagery captured by one or more cameras of the computing device to determine the object location.

At 508, the computing device can determine whether the object location corresponds to one of the selectable user interface elements. For example, in some implementations, the object location can be projected onto the display screen to determine whether the object location corresponds to one of the selectable user interface elements (e.g., whether the projected object location overlaps a boundary area associated with one of the elements).

If it is determined at 508 that the object location does not correspond to one of the selectable user interface elements, then method 500 can return to 506 and again determine the object location. However, if it is determined at 508 that the object location does not correspond to one of the selectable user interface elements, then method 500 can proceed to 510.

At 510, the computing device can visually modify the user interface element to which the object location corresponds. Any of the different visual modification described herein can be performed at 510.

In one example, a user may use her finger to hover over the display of the device. When the user's finger is located over (or within a certain distance of) a user interface element that is selectable, the computing device can visually modify such user interface element (e.g., using any combination of one or more of the visual modifications described herein).

At 514, the computing device can determine whether the user selected the user interface element that was visually modified at 510. If it is determined at 514 that the user did not select the user interface element, then method 500 can return to 506 and again determine the object location. However, if it is determined at 514 that the user selected the user interface element, then method 500 can proceed to 516.

At 516, the computing device can provide a new user interface that enables the user to search, store, and/or communicate information associated with the user interface element.

FIGS. 6A-D depict an example modification of example user interface elements based on a location of an example user object relative to the user interface elements according to example embodiments of the present disclosure.

Figure 6A:
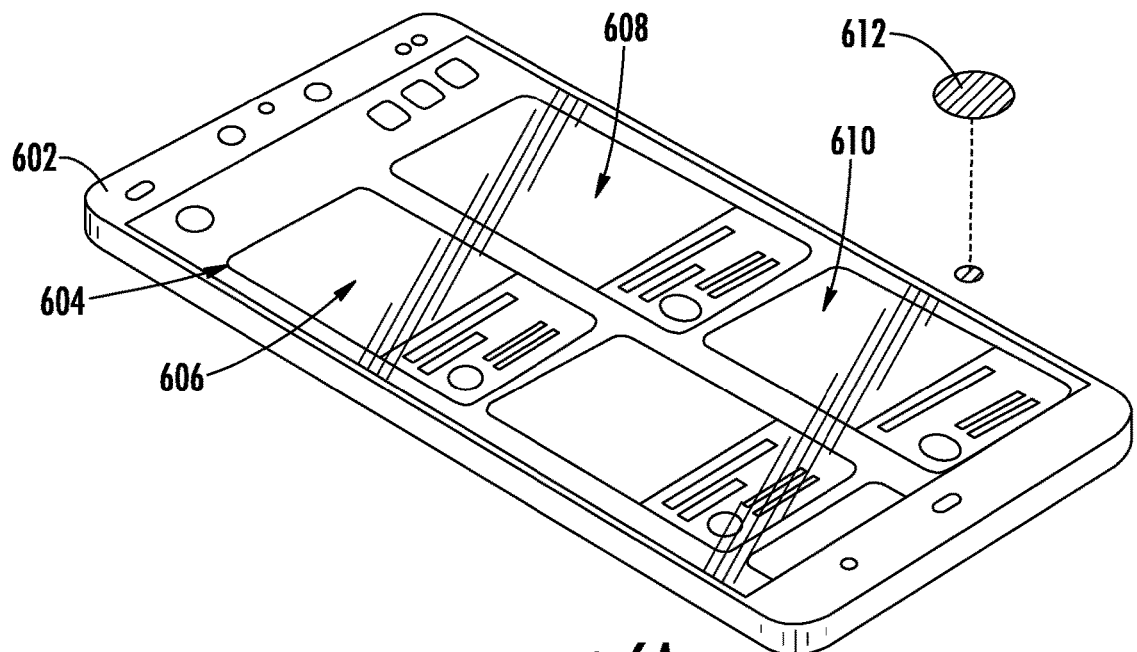
FIGS. 6A-D depict an example modification of example user interface elements based on a location of an example user object relative to the user interface elements according to example embodiments of the present disclosure.

Referring first to FIG. 6A, a computing device 602 is displaying a user interface 604. The user interface 604 includes a number of user interface elements, including, for example, user interface elements 606, 608, and 610. A user is holding her finger at an object location 612. The object location 612 does not correspond to any of the user interface elements.

Figure 6B:
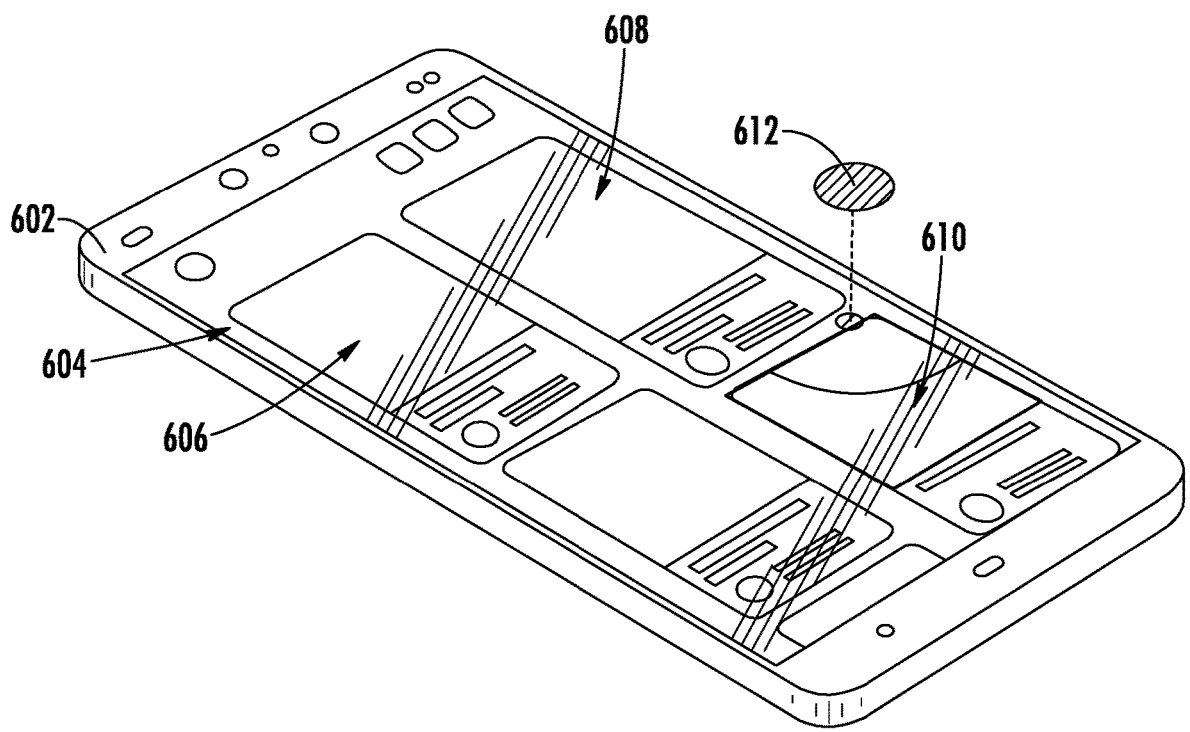

Referring now to FIG. 6B, the user has moved her finger to change the object location 612. In FIG. 6B, the object location 612 does correspond to the user interface element 610. In particular, as an example, a projection of the object location 612 onto the user interface 604 is within an area associated with the user interface element 610. As a result, the computing device 602 can visually modify the user interface element 610. For example, as illustrated in FIG. 6B, element 610 has been visually modified to have a bolder outline.

Figure 6C:
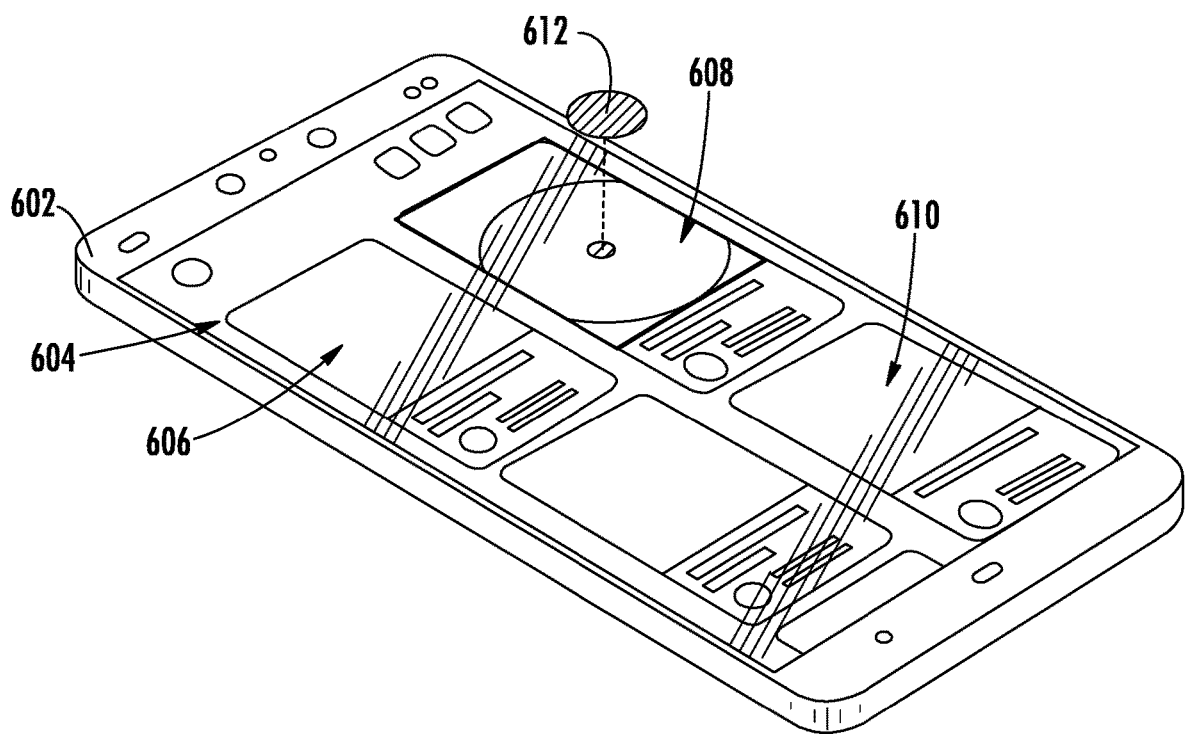
Figure 6D:
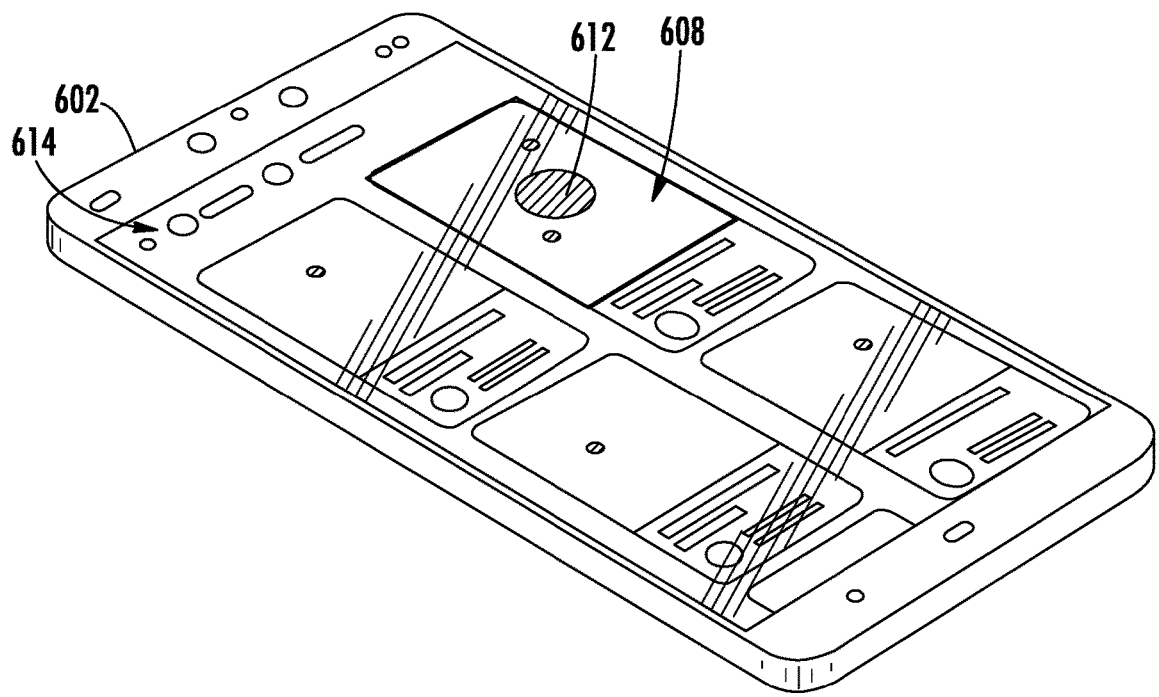

Referring now to FIG. 6C, the user has again moved her finger to change the object location 612. In FIG. 6C, the object location 612 corresponds to the user interface element 608. In particular, as an example, a projection of the object location 608 onto the user interface 604 is within an area associated with the user interface element 608. As a result, the computing device 602 can visually modify the user interface element 608. For example, as illustrated in FIG. 6C, element 608 has been visually modified to have a bolder outline. Notably, element 610 does not have the bolder outline any longer.

Referring now to FIG. 6D, the user has again moved her finger to press the display at the location of user interface element 608, thereby selecting user interface element 608. As a result, the computing device has provided an additional or modified user interface 614 on the display. The additional user interface 614 can enable the user to search, store, and/or share information about the user interface element 608 (e.g., about its associated entity such as a food dish "paella").

Thus, a user may hover her finger over the display screen and move her finger to different locations to discover (e.g., via the resulting visual modification of the user interface elements) which of the user interface elements are selectable. The location of the user object (e.g., finger) relative to the display screen can be identified in any number of ways including, for example, use of cameras, use of capacitive sensing technologies, and/or the RADAR sensing system as described elsewhere herein.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 2 and 5 respectively depict steps performed in a particular order for purposes of illustration and discussion, the methods of the present disclosure are not limited to the particularly illustrated order or arrangement. The various steps of the methods 200 and 500 can be omitted, rearranged, combined, and/or adapted in various ways without deviating from the scope of the present disclosure.

What is claimed is:

1. A computing device, comprising:
one or more processors;
a display; and
one or more non-transitory computer-readable media that collectively store instructions that, when executed by the one or more processors, cause the computing device to perform operations, the operations comprising:
providing a user interface that comprises a plurality of user interface elements for presentation on the display;
continuously identifying one or more of the user interface elements that are selectable, as defined as belonging to a predetermined set of entities, by a user of the computing device using one or more machine-learned models to recognize selectable entities within the user interface;
determining an object location of a user object relative to the display, wherein the user object comprises a finger or a stylus located adjacent to the display but not physically touching the display;
determining whether the object location of the user object corresponds to one of the one or more user interface elements that are selectable by the user; and
when the object location corresponds to a first user interface element of the one or more user interface elements that are selectable by the user, visually modifying at least the first user interface element of the one or more identified selectable user interface elements to have a modified appearance that indicates that the first user interface element is selectable by the user, without visually modifying other user interface elements that are not selectable by the user so as to visually distinguish the one or more user interface elements that are selectable by the user from the other user interface elements that are not selectable by the user, and wherein visually modifying at least the first user interface element comprises implementing a particular type of visual modification based on a content type associated with the first user interface element.

2. The computing device of claim 1, wherein the operations further comprise:
 determining an orientation of the computing device relative to a user object associated with a user of the computing device;
 wherein the operation of visually modifying the first user interface element to have the modified appearance comprises:
  determining a reflection location within the first user interface element based at least in part on the orientation of the computing device relative to the user object; and
  visually modifying the first user interface element to have a gleam appearance in which the first user interface element appears to reflect light at the reflection location within the first user interface element.

3. The computing device of claim 2, wherein the user object comprises a finger or a stylus located adjacent to the display but not physically touching the display.

4. The computing device of claim 2, wherein the computing device further comprises:
 a RADAR sensing system that senses an object location of the user object;
 wherein the operation of determining the orientation of the computing device relative to the user object comprises determining the orientation of the computing device relative to the object location sensed by the RADAR sensing system.

5. The computing device of claim 2 wherein:
 the user object comprises a face of the user;
 the computing device further comprises one or more cameras that capture imagery;
 the operations further comprise determining a face location of the face of the user based on the imagery captured by the one or more cameras; and
 the operation of determining the orientation of the computing device relative to the user object comprises determining the orientation of the computing device relative to the face location of the face of the user.

6. The computing device of claim 1, wherein:
 the computing device further comprises a gyroscope;
 the operations further comprise determining an orientation of the computing device based on data produced by the gyroscope; and
 the operation of visually modifying the first user interface element to have the modified appearance comprises:
  determining a reflection location within the first user interface element based at least in part on the orientation of the computing device; and
  visually modifying the first user interface element to have a gleam appearance in which the first user interface element appears at the reflection location.

7. The computing device of claim 3, further comprising, after visually modifying the first user interface element:
 receiving a user touch input from the user object that selects the first user interface element; and
 in response to the user touch input, providing a second user interface for presentation on the display, wherein the second user interface enables the user to one or more of search, store, or communicate information associated with the first user interface element.

8. A computer-implemented method, comprising:
 providing, by one or more computing devices, a user interface that comprises a plurality of user interface elements for presentation on a display;
 identifying, by the one or more computing devices, one or more of the user interface elements that are selectable by a user;
 continuously identifying, by the one or more computing devices, one or more of the user interface elements that are selectable by a user, as defined as belonging to a predetermined set of entities using one or more machine-learned models to recognize selectable entities within the user interface;
 determining, by the one or more computing devices, an object location of a user object relative to the display, wherein the user object comprises a finger or a stylus located adjacent to the display but not physically touching the display;
 determining, by the one or more computing devices, whether the object location of the user object corresponds to one of the one or more user interface elements that are selectable by the user; and
 when the object location corresponds to a first user interface element of the one or more selectable user interface elements, visually modifying, by the one or more computing devices, the first user interface element to visually highlight the first user interface element, without visually modifying other user interface elements that are not selectable by the user so as to visually distinguish the one or more user interface elements that are selectable by the user from the other user interface elements that are not selectable by the user, and wherein visually modifying at least the first user interface element comprises implementing a particular type of visual modification based on a content type associated with the first user interface element.

9. The computer-implemented method of claim 8, wherein determining, by the one or more computing devices, whether the object location of the user object corresponds to one of the one or more user interface elements that are selectable by the user comprises determining, by the one or more computing devices, whether the finger or the stylus is hovering over one of the one or more user interface elements that are selectable by the user.

10. The computer-implemented method of claim 8, wherein visually modifying, by the one or more computing devices, the first user interface element to visually highlight the first user interface element comprises temporarily visually modifying, by the one or more computing devices, the first user interface element to visually highlight the first user interface element.

11. The computer-implemented method of claim 8, wherein visually modifying, by the one or more computing devices, the first user interface element to visually highlight the first user interface element comprises visually modifying, by the one or more computing devices, the first user interface element according to an orientation of the display relative to the object location of the user object.

12. The computer-implemented method of claim 11, wherein visually modifying, by the one or more computing devices, the first user interface element according to the orientation of the display relative to the object location of the user object comprises:
 visually modifying, by the one or more computing devices, the first user interface element to have a gleam appearance in which the first user interface element appears to reflect light;
 wherein a reflection location at which the first user interface element appears to reflect light is based at least in part on the orientation of the display relative to the object location of the user object.

13. The computer-implemented method of claim 8, wherein visually modifying, by the one or more computing devices, the first user interface element to visually highlight the first user interface element comprises:

determining, by the one or more computing devices, a first content type associated with the first user interface element; and visually modifying, by the one or more computing devices, the first user interface element according to a first modification type selected from a plurality of different available modification types that are respectively associated with a plurality of different content types.

14. The computer-implemented method of claim 8, wherein determining, by the one or more computing devices, the object location of the user object relative to the display comprises receiving, by the one or more computing devices, RADAR data from a RADAR sensing system that describes the object location of the user object relative to the display.

15. The computer-implemented method of claim 8, further comprising:

receiving, by the one or more computing devices, a user touch input from the user object that selects the first user interface element; and in response to the user touch input, providing, by the one or more computing devices, a second user interface for presentation on the display, wherein the second user interface enables the user to store information associated with the first user interface element for later retrieval.

16. Apparatus configured:

to provide a user interface that comprises a plurality of user interface elements for presentation on a display;

to identify a subset of one or more of the user interface elements that are selectable by a user, wherein the subset of selectable user interface elements is identified based on contextual data associated with the user interface elements and using one or more machine-learned models to recognize selectable entities within the user interface; and to modify display of the subset of selectable user interface elements as a function of a location of a finger or stylus located adjacent to the display but not physically touching the display, without modifying display of other user interface elements that are not selectable by the user so as to visually distinguish the one or more user interface elements that are selectable by the user from the other user interface elements that are not selectable by the user, and wherein modifying display of the subset of selectable user interface elements comprises implementing a particular type of visual modification based on a content type associated with the subset of selectable user interface elements.

17. Apparatus as claimed in claim 16, wherein the apparatus is configured to display the one or more selectable user interface elements without modification in the presence of a first condition and to modify in real time display of selectable user interface elements as a function of the location of the finger or stylus located adjacent to the display but not physically touching the display in the absence of the first condition, the first condition being a neutral orientation of the apparatus.

18. Apparatus as claimed in claim 16, wherein the apparatus is configured to visually modify the subset of selectable user interface elements in a first way for textual user interface elements and in a second, different way for pictorial or graphical elements.

* * * * *